(12) United States Patent
England et al.

(10) Patent No.: US 8,555,731 B1
(45) Date of Patent: Oct. 15, 2013

(54) SELF-CONTAINED TUBULAR COMPRESSED-FLOW GENERATION DEVICE FOR USE IN MAKING DIFFERENTIAL MEASUREMENTS

(75) Inventors: John Dwight England, Arab, AL (US); Anthony R. Kelley, Sommerville, AL (US); Raymond J. Cronise, Huntsville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 195 days.

(21) Appl. No.: 13/302,773

(22) Filed: Nov. 22, 2011

(51) Int. Cl.
  *G01F 1/34* (2006.01)
(52) U.S. Cl.
  USPC ........................................... 73/861.42
(58) Field of Classification Search
  USPC ........................................... 73/861.42
  See application file for complete search history.

(56) References Cited

U.S. PATENT DOCUMENTS

| | | | |
|---|---|---|---|
| 3,558,162 A | 1/1971 | Ferrai et al. | |
| 4,823,615 A | 4/1989 | Taha | |
| 4,968,066 A | 11/1990 | Adams | |
| 5,612,499 A | 3/1997 | Andrew et al. | |
| 5,853,030 A | 12/1998 | Walding | |
| 5,971,001 A | 10/1999 | Andersson | |
| 6,928,884 B1 * | 8/2005 | Pearson | 73/861.42 |
| 7,001,106 B2 | 2/2006 | Burnham et al. | |
| 7,070,209 B2 | 7/2006 | Collins | |
| 7,458,280 B2 * | 12/2008 | Wehrs et al. | 73/861.42 |
| 7,497,772 B2 | 3/2009 | Laib | |
| 7,674,072 B2 | 3/2010 | Shook et al. | |
| 7,681,461 B2 | 3/2010 | Rosenbaum et al. | |
| 7,735,381 B2 | 6/2010 | Lodolo | |
| 7,810,400 B2 * | 10/2010 | Gysling et al. | 73/861.42 |
| 7,992,453 B1 * | 8/2011 | Lawrence | 73/861.42 |

FOREIGN PATENT DOCUMENTS

EP    0249362 A1    12/1987

* cited by examiner

*Primary Examiner* — Jewel V Thompson
(74) *Attorney, Agent, or Firm* — Peter J. Van Bergen; James J. McGroary

(57) ABSTRACT

A device used in making differential measurements of a flow includes an open-ended tubular flow obstruction and a support arm. The flow obstruction has an outer annular wall and an inner annular wall. The support arm has a first end coupled to an exterior wall of a conduit and a second end coupled to the flow obstruction. The support arm positions the flow obstruction in the conduit such that a first flow region is defined around the flow obstruction's outer annular wall and a second flow region is defined by the flow obstruction's inner annular wall. The support arm's first end and second end are separated from one another with respect to a length dimension of the conduit. Measurement ports provided in the flow obstruction are coupled to points at the exterior wall of the conduit by manifolds extending through the flow obstruction and support arm.

25 Claims, 3 Drawing Sheets

SELF-CONTAINED TUBULAR COMPRESSED-FLOW GENERATION DEVICE FOR USE IN MAKING DIFFERENTIAL MEASUREMENTS

ORIGIN OF THE INVENTION

The invention described herein was made in part by employees of the United States Government and may be manufactured and used by or for the Government of the United States of America for governmental purposes without the payment of any royalties thereon or therefor.

CROSS-REFERENCE TO RELATED PATENT APPLICATIONS

This patent application is co-pending with one related patent application entitled "SELF-CONTAINED COMPRESSED-FLOW GENERATION DEVICE FOR USE IN MAKING DIFFERENTIAL MEASUREMENTS", filed by the same inventors and owned by the same assignee as this patent application.

BACKGROUND OF THE INVENTION

1. Field of the Invention

This invention relates to flow measurement tools. More specifically, the invention is a self-contained device that generates compressed flow in a conduit for use in making differential measurements in a flow.

2. Description of the Related Art

For a variety of reasons, devices are needed that can be adapted to an existing fluid conduit for the temporary or permanent provision of specific functions. One such function is the measurement of a parameter of a flowing fluid. Other functions include mixing the flowing fluid and/or injecting a second fluid into the (main) flowing fluid. With respect to parameter measurement, attributes of interest include pressure, velocity, density, temperature, etc. Currently, many flow "measurement" devices collect flow information that is then used in some approximation or modeling scheme to estimate flow attributes. In addition, current flow measurement devices are installed by cutting fully through existing conduits and then "splicing" the flow measurement devices into the conduit. This can be time consuming, tedious, and costly. This is especially problematic when making differential measurements (i.e., at two spaced apart locations along a conduit) as multiple devices must be spliced into a conduit with the entire installation then requiring calibration to account for installation irregularities. Still further, current differential flow measurement devices can create substantial pressure losses effecting pump efficiency. Flow measurement devices can also be the source of a blockage in a conduit when solids and/or foreign matter are present in a flowing fluid (e.g., man-made debris, natural debris such as hair, sticks, leaves, etc.). For example, a flow measurement device such as an orifice plate is readily clogged with debris thereby impacting flow measurements and the flow itself.

SUMMARY OF THE INVENTION

Accordingly, it is an object of the present invention to provide a device that can be used when making differential measurements in a flowing fluid.

Another object of the present invention is to provide a device that can be readily installed in an existing conduit or duct in preparation for making differential measurements of a fluid flow moving through the conduit.

Still another object of the present invention is to provide a flowing-fluid differential measurement-supporting device that is resistant to clogging.

Other objects and advantages of the present invention will become more obvious hereinafter in the specification and drawings.

In accordance with the present invention, a compressed-flow generation device for use in making differential measurements of flow attributes includes an open-ended tubular flow obstruction and a support arm. The flow obstruction has an outer annular wall and an inner annular wall. The outer annular wall is shaped to define a maximum radius portion of the flow obstruction, and the inner annular wall is shaped to define a minimum radius portion of the flow obstruction. A support arm has a first end and a second end with the first end coupled to an exterior wall of a conduit and the second end coupled to the flow obstruction. The support arm positions the flow obstruction in the conduit such that a first flow region is defined around the flow obstruction's outer annular wall and a second flow region is defined by the flow obstruction's inner annular wall. The support arm's first end and second end are separated from one another with respect to a length dimension of the conduit. At least one upstream measurement port is formed in the support arm. A first manifold is formed in the support arm and is in fluid communication with each upstream measurement port. The first manifold terminates and is accessible at the exterior wall of the conduit. At least one downstream measurement port is formed in the flow obstruction with each downstream measurement port being in fluid communication with one of the first flow region and the second flow region. At least one second manifold is formed in the flow obstruction and support arm. Each second manifold is in fluid communication with each downstream measurement port so-communicating with one of the first flow region and the second flow region. Each second manifold terminates and is accessible at the exterior wall of the conduit.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
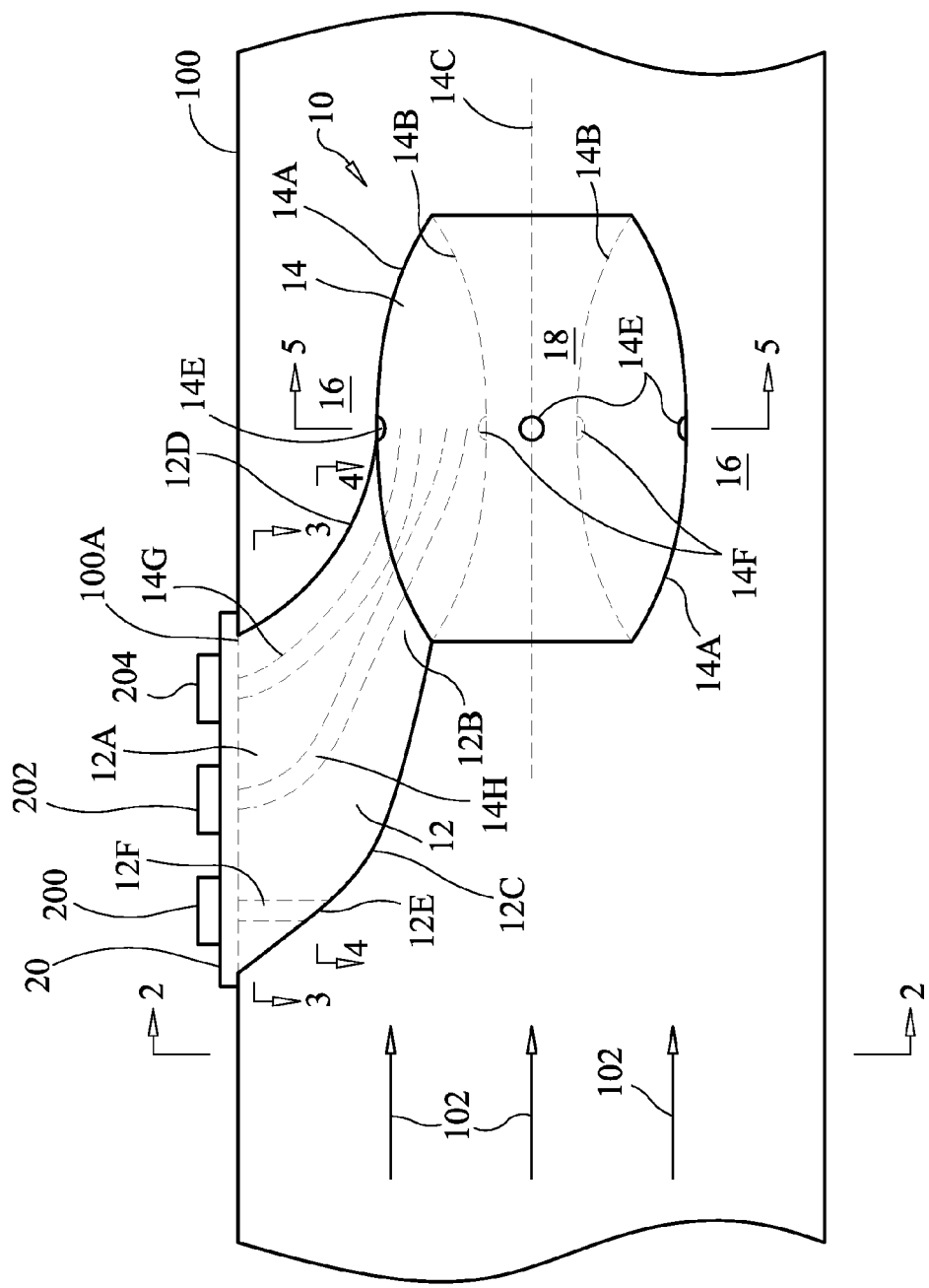
FIG. 1 is a side view of a self-contained device for generating a compressed flow in a conduit to facilitate differential measurements in accordance with an embodiment of the present invention.
Figure 2:
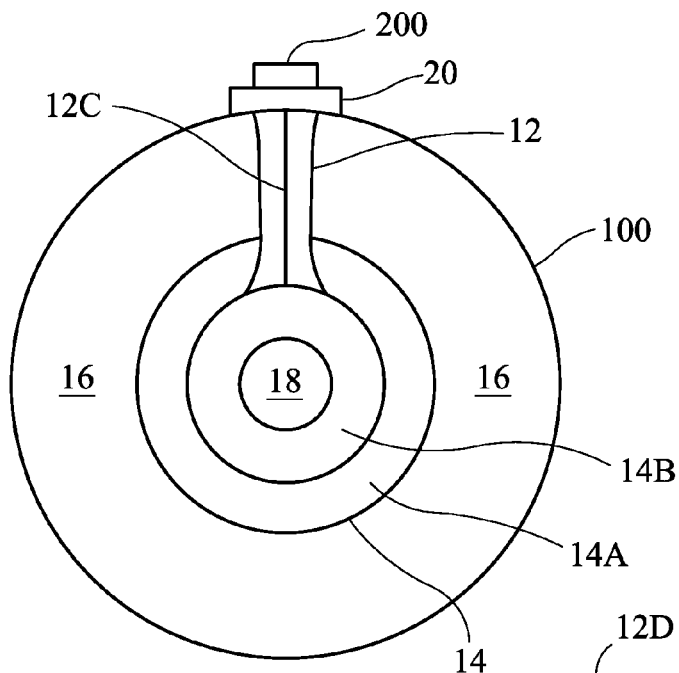
FIG. 2 is a head-on view of the self-contained device taken from an upstream location indicated by line 2-2 in FIG. 1.

Referring now to the drawings, simultaneous reference will be made to FIGS. 1-5 where a variety of views of a self-contained device for generating a compressed flow in a conduit to facilitate the collection of differential measurements in accordance with an embodiment of the present invention is shown and is referenced generally by numeral 10. Device 10 is positioned/mounted in a conduit 100 that carries a flowing fluid moving in a known direction where such fluid and its flow direction are indicated by arrows 102. The terms "upstream" and "downstream" as used herein are referenced to the flow direction of fluid flow 102. Fluid flow 102 can be a gas, vapor, a pure liquid, or a gas or liquid mixed with some solids that are present by design or by circumstance. For example, fluid flow 102 could contain natural or man-made debris that must pass through conduit 100 and past device 10 to maintain flow efficiency.

In general, device 10 is a self-contained device that positions measurement ports in fluid flow 102 in a pre-determined and definitive manner such that differential measurements concerning flow 102 can be made easily and precisely. Device 10 includes a support arm 12 and a compressed-flow-generating obstruction 14. Obstruction 14 is positioned in fluid flow 102 by support arm 12 such that fluid flow 102 is compressed in a region 16 around obstruction 14 and in a region 18 extending through obstruction 14. Measurement ports are provided in both support arm 12 and obstruction 14 to facilitate differential measurements concerning fluid flow 102. That is, one or more measurement ports are located in support arm 12 where fluid flow 102 is not compressed, and one or more measurement ports are located in obstruction 14 where fluid flow 102 is compressed to thereby create a differential measurement environment.

Support arm 12 and obstruction 14 can be separate elements coupled to one another or they can be formed as an integrated device (e.g., molded as one piece). In either case, device 10 can be installed as part of conduit 100 or can be installed in an existing conduit 100. In terms of an existing conduit 100, an installation/entry aperture (indicated by dashed line 100A) is cut in conduit 100. Aperture 100A is sized/shaped to receive support arm 12 and obstruction 14 therethrough. Once positioned in conduit 100, device 10 is coupled and sealed to conduit 100 by means of a mounting/sealing arrangement 20, the design of which is not a limitation of the present invention. Since conduit 100 need only have a simple aperture 100A cut therein, the overall integrity, shape, and size of conduit 100 is maintained such that device 10 has little or no impact on the existing system.

Figure 3:
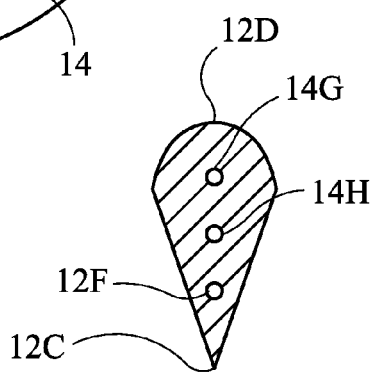
FIG. 3 is a cross-sectional view of the device's support arm taken along line 3-3 in FIG. 1.
Figure 4:
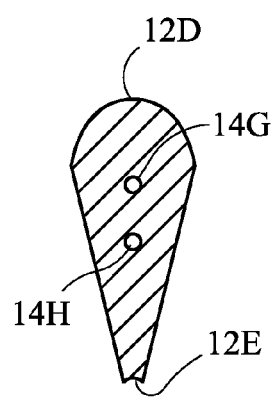
FIG. 4 is a cross-sectional view of the device's support arm taken along line 4-4 in FIG. 1.

In general, support arm 12 is shaped to position obstruction 14 such that the above-described compressed flow regions 16 and 18 are downstream (with respect to the flow direction of fluid flow 102) of an upstream portion of support arm 12. For example, in the illustrated embodiment, support arm 12 defines a smooth arcuate shape along its length with its upstream end 12A coupled to conduit 100 by mounting/sealing arrangement 20. The downstream end 12B of support arm 12 is coupled to obstruction 14 with downstream end 12B blending smoothly into obstruction 14 to minimize turbulence at this interface. The leading edge 12C of support arm 12 facing into the oncoming fluid flow 102 can be tapered as illustrated in FIG. 3 to reduce or eliminate the capture of any debris (not shown) present in fluid flow 102. In other embodiments, leading edge 12A and trailing edge 12D of support arm 12 can be rounded or otherwise shaped to minimize turbulence as fluid flow 102 goes by while also providing the necessary structural integrity to support obstruction 14.

As mentioned above, one or more measurement ports are provided in support arm 12 at a location(s) that is upstream of compressed-flow regions 16 and 18. In the illustrated embodiment, a single port 12E (also shown in FIG. 4) is located at leading edge 12C. However, it is to be understood that the upstream port(s) could be located near leading edge 12C without departing from the scope of the present invention. A manifold 12F formed in support arm 12 provides fluid communication between port 12E and end 12A at arrangement 20. Typically, a sensor 200 is positioned outside of conduit 100 and is fluid communication with manifold 12F. Sensor 200 is used to collect upstream (i.e., non-compressed) information concerning fluid flow 102. Sensor 200 can be a pressure sensor, strain gauge, fiber optic sensor, etc., and can be used in conjunction with a temperature sensor.

Obstruction 14 is an open-ended tube with its outer annular wall 14A facing the inside wall of conduit 100 to thereby define compressed flow region 16, and with its inner annular wall 14 facing/defining compressed flow region 18. In general, when looking at a longitudinal cross-section of obstruction 14 between flow regions 16 and 18, each of walls 14A and 14B is defined by a curvilinear shape. By virtue of each wall's curvilinear shape, some portion of outer annular wall 14A forms the largest radius of obstruction 14 while some portion of inner annular wall 14B forms the smallest radius of obstruction 14. The radius of obstruction 14 is measured with respect to the central longitudinal axis of obstruction 14 that is indicated by dashed line 14C. For the illustrated embodiment, mirror-imaged convex curves define the shape of walls 14A and 14B when looking at a longitudinal cross-section of obstruction 14 between flow regions 16 and 18. Accordingly, the maximum radius portion and minimum radius portion of obstruction 14 are longitudinally aligned with one another. As a result, maximum compression of fluid flow 102 in regions 16 and 18 occurs at the same longitudinal regions of obstruction 14 and conduit 100. However, as will be explained further below, the present invention is not so limited as the curvilinear shapes of walls 14A and 14B can be different (i.e., not mirror images of one another) without departing from the scope of the present invention.

As fluid flow 102 moves past obstruction 14, the fluid is compressed in regions 16 and 18. To compress fluid flow 102 evenly thereabout (or nearly so), support arm 12 positions obstruction 14 such that longitudinal axis 14C is centrally positioned (or nearly so) in conduit 100. To facilitate measurement of attributes of fluid flow 102 so-compressed at regions 16 and/or 18, one or more measurement ports in obstruction 14 can be positioned at location(s) in fluid communication with region 16 or region 18. For example, in the illustrated embodiment, a number of ports 14E are formed in outer annular wall 14A at the maximum radius portion of obstruction 14, and a number of ports 14F are formed in inner annular wall 14B at the minimum radius portion of obstruction 14. More specifically in the illustrated embodiment, ports 14E are distributed (e.g., evenly) circumferentially about outer annular wall 14A to face compressed flow region 16. Similarly, ports 14F are distributed (e.g., evenly) about inner annular wall 14B to face compressed flow region 18.

Figure 5:
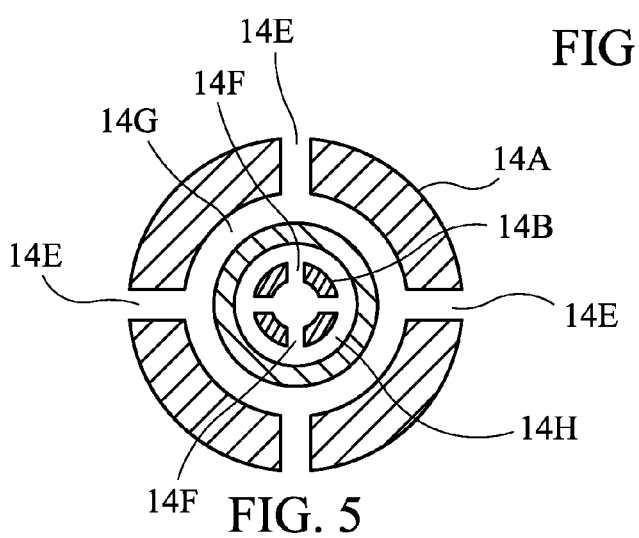
FIG. 5 is a cross-sectional view of the device's flow obstruction taken along line 5-5 in FIG. 1.

Referring additionally to FIG. 5, ports 14E are in fluid communication with a single manifold 14G that provides fluid communication between ports 14E and support arm end 12A at arrangement 20. That is, manifold 14G extends through obstruction 14 and support arm 12. By distributing ports 14E annularly about outer annular wall 14A and linking them to manifold 14G, the attributes of fluid flow 102 at region 16 are averaged. It should be noted that the number/locations of the ports can be dependent on a variety of factors such as the fluid's velocity, density, etc. Accordingly, the number and locations of ports 14E can be varied from those shown without departing from the scope of the present invention.

In similar fashion, ports 14F are in fluid communication with a single manifold 14H that provides fluid communication between ports 14F and support arm end 12A at arrangement 20. That is, manifold 14H also extends through obstruction 14 and support arm 12. Distribution of ports 14F around inner annular wall 14B and the linking of them to manifold 14H results in the averaging of the attributes of fluid flow 102 at region 18. The number and location of ports 14F can be varied from the illustrated embodiment without departing from the scope of the present invention.

Separate sensors 202 and 204 are positioned outside of conduit 100 and in fluid communication with manifolds 14H and 14G, respectively. Each sensor is used to collect downstream/compressed-flow information concerning fluid flow 102 in either region 16 or region 18. Similar to sensor 200, each of sensors 202 and 204 can be a pressure sensor, strain gauge, fiber optic sensor, etc., and can be used in conjunction with a temperature sensor. Sensors 202 and 204 enable flow accuracy optimization over an extended flow range and enable calculation of various properties such as density, viscosity, etc.

The portions of obstruction 14 downstream of its measurement ports can be shaped in a variety of ways without departing from the scope of the present invention. For example, the portion of obstruction 14 downstream of its measurement ports can be shaped to minimize turbulence, pressure loss, etc. In other applications, the portion of obstruction 14 downstream of its measurement ports could be shaped to create/induce some secondary movement/action in fluid flow 102 as it passes obstruction 14.

Figure 6:
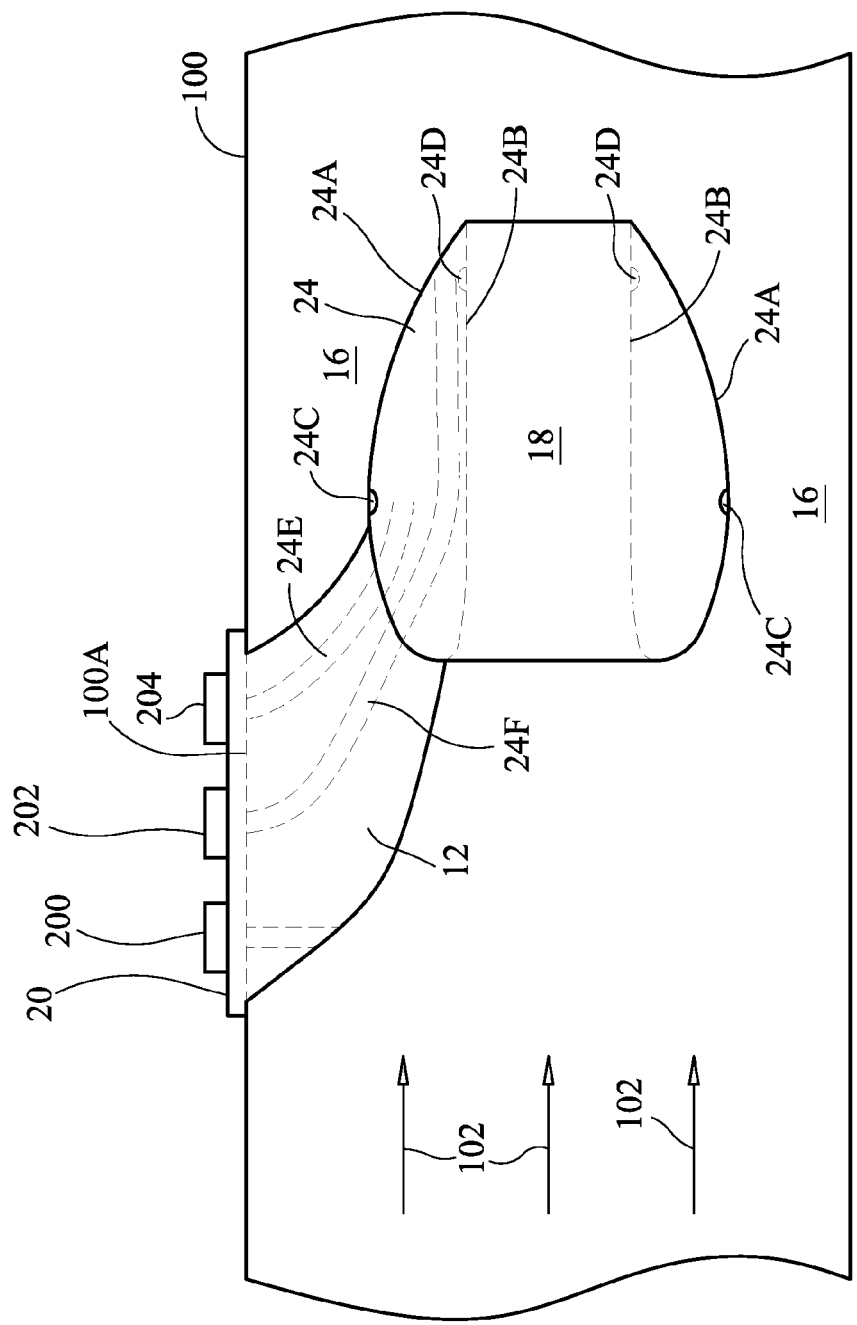
FIG. 6 is a side view of a self-contained device in accordance with another embodiment of the present invention.

As mentioned above, the present invention is not limited to the mirror-image convex curvilinear shapes of walls 14A and 14B described herein. Accordingly, FIG. 6 illustrates another embodiment of the present invention where support arm 12 is coupled to an open-ended tubular flow obstruction 24 has an outer annular wall 24A and an inner annular wall 24B. Outer annular wall 24A faces flow region 16 flowing around obstruction 24 while inner annular wall 24B defines flow region 18 passing through obstruction 24. A longitudinal cross-section of obstruction 24 between flow regions 16 and 18 defines an airfoil shape where outer annular wall 24A forms the low-pressure side of the airfoil shape and inner annular wall 24B forms the high-pressure side of the airfoil shape. Note that the airfoil shape could be reversed such that the low-pressure side of the airfoil faced region 18 and the high-pressure side of the airfoil shape faced region 16. In either case, the resulting lift effect is useful to provide a lower absolute pressure along the low-pressure side, at and beyond the maximum radius portion, thereby increasing the measurable delta pressure between the upstream port and the downstream port at the low-pressure side and between the high-pressure and low-pressure side of the airfoil. This increases the measured flow signal which increases measured flow resolution. As a result, higher precision sensors are not needed at low flow rates, or conversely, the measurement device is more efficient and will have less impact on the flow in terms of permanent pressure losses and the device will operate over a larger fluid flow range.

Similar to the previously-described embodiment, one or more measurement ports can be formed in one or both walls 24A and 24B with corresponding manifolds being provided/defined within obstruction 24 and support arm 12. For example, ports 24C in wall 24A are located at the maximum radius portion of obstruction 24, and ports 24D in wall 24B are located downstream of ports 24C. One manifold 24E is in fluid communication with ports 24C and another manifold 24F is in fluid communication with ports 24D. Each manifold leads to a sensor (i.e., manifold 24F leads to sensor 202 and manifold 24E leads to sensor 204) at the exterior of conduit 100 as in the previously-described embodiment.

The advantages of the present invention are numerous. The self-contained device will provide for multiple differential measurements in a fluid flow. The device is easily installed in existing conduits and does not disturb the basic conduit installation or structural integrity. The device's measurements ports are fixed/known 'a priori' thereby eliminating the need for calibration at each installation. The device is configured to greatly reduce or eliminate the possibility of being clogged with foreign matter and debris and will, therefore, require little or no maintenance and will not impact flow/pump efficiencies. The multiple differential measurement locations enable flow cross-checking to evaluate proper instrumentation function and to calculate flowing fluid properties such as density, viscosity, etc.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A compressed-flow generation device for use in making differential measurements of flow attributes, comprising:
    an open-ended tubular flow obstruction having an outer annular wall and an inner annular wall, said outer annular wall shaped to define a maximum radius portion of said flow obstruction, said inner annular wall shaped to define a minimum radius portion of said flow obstruction;
    a support arm having a first end and a second end, said first end adapted to be coupled to an exterior wall of a conduit, said second end coupled to said flow obstruction, wherein said support arm is adapted to position said flow obstruction in the conduit wherein a first flow region is defined around said outer annular wall and a second flow region is defined by said inner annular wall, and wherein said first end and said second end are separated from one another with respect to a length dimension of the conduit;
    at least one upstream measurement port formed in said support arm;
    a first manifold formed in said support arm and in fluid communication with each said upstream measurement port, said first manifold terminating and accessible at the exterior wall of the conduit;
    at least one downstream measurement port formed in said flow obstruction, each said downstream measurement port in fluid communication with one of said first flow region and said second flow region; and
    at least one second manifold formed in said flow obstruction and said support arm, each said second manifold in fluid communication with each said downstream measurement port so-communicating with one of said first flow region and said second flow region, each said second manifold terminating and accessible at the exterior wall of the conduit.

2. A compressed-flow generation device as in claim 1, wherein said at least one downstream measurement port comprises a plurality thereof distributed circumferentially about one of said outer annular wall and said inner annular wall.

3. A compressed-flow generation device as in claim 1, wherein said at least one downstream measurement port comprises a plurality thereof distributed circumferentially about each of said outer annular wall and said inner annular wall.

4. A compressed-flow generation device as in claim 1, wherein said support arm is shaped to position said second flow region at a central portion of the conduit.

5. A compressed-flow generation device as in claim 1 wherein, in terms of a fluid flow direction in the conduit, said first end is upstream of said second end, and wherein said support arm defines a tapered edge facing the fluid flow direction.

6. A compressed-flow generation device as in claim 5, wherein each said upstream measurement port is located at said tapered edge.

7. A compressed-flow generation device as in claim 1, wherein said outer annular wall is a mirror image of said inner annular wall.

8. A compressed-flow generation device as in claim 1, wherein a longitudinal cross-section of said flow obstruction spanning from said first flow region to said second flow region defines an airfoil shape.

9. A compressed-flow generation device as in claim 1, wherein said maximum radius portion and said minimum radius portion are aligned with one another along a longitudinal dimension of said flow obstruction.

10. A compressed-flow generation device for use in making differential measurements of attributes of a fluid moving in a flow direction through a conduit, comprising:
   an open-ended tubular flow obstruction having an outer annular wall and an inner annular wall, wherein a longitudinal profile of said outer annular wall is curvilinear in the flow direction with a portion of said outer annular wall defining a maximum radius of said flow obstruction, and wherein a longitudinal profile of said inner annular wall is curvilinear in the flow direction with a portion of said inner annular wall defining a minimum radius of said flow obstruction;
   an arcuately-shaped support arm having a first end and a second end, said first end adapted to be coupled to an exterior wall of a conduit, said second end coupled to said flow obstruction, wherein said support arm is adapted to position said flow obstruction centrally in the conduit wherein a first flow region is defined around said outer annular wall and a second flow region is defined by said inner annular wall, and wherein said first end and said second end are separated from one another along the flow direction with said first end being upstream of said second end;
   at least one measurement port formed in said support arm;
   a first manifold formed in said support arm and in fluid communication with each said measurement port so-formed in said support arm, said first manifold terminating and accessible at the exterior wall of the conduit;
   at least one measurement port formed in said flow obstruction, each said measurement port so-formed in said flow obstruction in fluid communication with one of said first flow region and said second flow region; and
   at least one second manifold formed in said flow obstruction and said support arm, each said second manifold in fluid communication with each said measurement port so-communicating with one of said first flow region and said second flow region, each said second manifold terminating and accessible at the exterior wall of the conduit.

11. A compressed-flow generation device as in claim 10, wherein said at least one measurement port so-formed in said flow obstruction comprises a plurality thereof distributed circumferentially about one of said outer annular wall and said inner annular wall.

12. A compressed-flow generation device as in claim 10, wherein said at least one measurement port so-formed in said flow obstruction comprises a plurality thereof distributed circumferentially about each of said outer annular wall and said inner annular wall.

13. A compressed-flow generation device as in claim 10, wherein said support arm defines a tapered edge facing the flow direction.

14. A compressed-flow generation device as in claim 13, wherein each said measurement port so-formed in said support arm is located at said tapered edge.

15. A compressed-flow generation device as in claim 10, wherein said outer annular wall is a mirror image of said inner annular wall.

16. A compressed-flow generation device as in claim 10, wherein a longitudinal cross-section of said flow obstruction spanning from said first flow region to said second flow region defines an airfoil shape.

17. A compressed-flow generation device as in claim 10, wherein said maximum radius of said flow obstruction and said minimum radius of said flow obstruction are aligned with one another along a longitudinal dimension of said flow obstruction.

18. A compressed-flow generation device for use in making differential measurements of attributes of a fluid moving in a flow direction through a conduit, comprising an integrated device adapted to be inserted through an aperture formed in an exterior wall of a conduit, adapted to be suspended from and sealed to the exterior wall at the aperture, and adapted to reside in the conduit, said integrated device including
   an open-ended tubular flow obstruction adapted to pass through the aperture, said flow obstruction having an outer annular wall and an inner annular wall, wherein a longitudinal profile of said outer annular wall is curvilinear in the flow direction with a portion of said outer annular wall defining a maximum radius of said flow obstruction, and wherein a longitudinal profile of said inner annular wall is curvilinear in the flow direction with a portion of said inner annular wall defining a minimum radius of said flow obstruction,
   an arcuately-shaped support arm adapted to pass through the aperture, said support arm having a first end and a second end, said first end adapted to be coupled to an exterior wall of a conduit, said second end coupled to said flow obstruction, wherein said support arm is adapted to position said flow obstruction centrally in the conduit wherein a first flow region is defined around said outer annular wall and a second flow region is defined by said inner annular wall, and wherein said first end and said second end are separated from one another along the flow direction with said first end being upstream of said second end,
   at least one measurement port formed in said support arm,
   a first manifold formed in said support arm and in fluid communication with each said measurement port so-formed in said support arm, said first manifold terminating and accessible at the exterior wall of the conduit,
   at least one measurement port formed in said flow obstruction, each said measurement port so-formed in said flow obstruction in fluid communication with one of said first flow region and said second flow region, and
   at least one second manifold formed in said flow obstruction and said support arm, each said second manifold in fluid communication with each said measurement port so-communicating with one of said first flow region and said second flow region, each said second manifold terminating and accessible at the exterior wall of the conduit.

19. A compressed-flow generation device as in claim 18, wherein said at least one measurement port so-formed in said flow obstruction comprises a plurality thereof distributed circumferentially about one of said outer annular wall and said inner annular wall.

20. A compressed-flow generation device as in claim 18, wherein said at least one measurement port so-formed in said flow obstruction comprises a plurality thereof distributed circumferentially about each of said outer annular wall and said inner annular wall.

21. A compressed-flow generation device as in claim 18, wherein said support arm defines a tapered edge facing the flow direction.

22. A compressed-flow generation device as in claim 21, wherein each said measurement port so-formed in said support arm is located at said tapered edge.

23. A compressed-flow generation device as in claim 18, wherein said outer annular wall is a mirror image of said inner annular wall.

24. A compressed-flow generation device as in claim 18, wherein a longitudinal cross-section of said flow obstruction spanning from said first flow region to said second flow region defines an airfoil shape.

25. A compressed-flow generation device as in claim 18, wherein said maximum radius of said flow obstruction and said minimum radius of said flow obstruction are aligned with one another along a longitudinal dimension of said flow obstruction.

* * * * *